United States Patent
Kwon

(10) Patent No.: US 9,912,513 B2
(45) Date of Patent: *Mar. 6, 2018

(54) SYSTEM AND METHOD FOR SYNCHRONIZATION FOR OFDMA TRANSMISSION

(71) Applicant: NEWRACOM, INC., Irvine, CA (US)

(72) Inventor: Younghoon Kwon, Laguna Niguel, CA (US)

(73) Assignee: NEWRACOM, INC., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/203,717

(22) Filed: Jul. 6, 2016

(65) Prior Publication Data

US 2016/0315796 A1 Oct. 27, 2016

Related U.S. Application Data

(63) Continuation of application No. 14/868,303, filed on Sep. 28, 2015, now Pat. No. 9,413,581.
(Continued)

(51) Int. Cl.
*H04W 4/00* (2009.01)
*H04J 3/06* (2006.01)
(Continued)

(52) U.S. Cl.
CPC ....... *H04L 27/2665* (2013.01); *H04B 7/0452* (2013.01); *H04L 5/0007* (2013.01);
(Continued)

(58) Field of Classification Search
CPC .................................................. H04L 27/2665
See application file for complete search history.

(56) References Cited

U.S. PATENT DOCUMENTS 8,031,583 B2 10/2011 Classon
8,422,577 B1 4/2013 Shetty et al.
(Continued)

FOREIGN PATENT DOCUMENTS

WO WO-2010/050731 A2 5/2010

OTHER PUBLICATIONS

LAN/MAN Standards Committee of the IEEE Computer Society, "IEEE P802.11ah™/D5.0 Draft Standards for Information technology—Telecommunications and information exchange between systems Local and metropolitan area networks—Specific requirements, Part 11: Wireless LAN Medium Access Control (MAC) and Physical Layer (PHY) Specifications, Amendment 2: Sub 1 GHz License Exempt Operation,"Mar. 2015.
(Continued)

*Primary Examiner* — Gerald Smarth
(74) *Attorney, Agent, or Firm* — McDermott Will & Emery LLP

(57) ABSTRACT

In an example of wireless communications, an access point may send a downlink frame to multiple stations. The downlink frame may include information indicative of a cyclic prefix length to be utilized by the stations. In response, some or all of the stations may transmit their respective uplink frames to the access point. A cyclic prefix for a portion of each respective uplink frame may have a cyclic prefix length corresponding to the information included in the downlink frame. The downlink frame may be, for example, a beacon frame or a trigger frame. A trigger frame may allocate resources for uplink orthogonal frequency division multiple access (OFDMA) transmission. Other methods, apparatus, and computer-readable media are also disclosed.

19 Claims, 10 Drawing Sheets

Related U.S. Application Data

(60) Provisional application No. 62/061,503, filed on Oct. 8, 2014.

(51) Int. Cl.

| | | |
|---|---|---|
| *H04L 27/26* | (2006.01) | |
| *H04W 56/00* | (2009.01) | |
| *H04B 7/0452* | (2017.01) | |
| *H04L 5/00* | (2006.01) | |
| *H04W 84/12* | (2009.01) | |

(52) U.S. Cl.
CPC ......... *H04L 27/2666* (2013.01); *H04W 56/00* (2013.01); *H04W 84/12* (2013.01)

(56) References Cited

U.S. PATENT DOCUMENTS

| | | | |
|---|---|---|---|
| 8,467,373 B2* | 6/2013 | Ahn | H04L 27/2655 370/350 |
| 2004/0082356 A1 | 4/2004 | Walton | |
| 2006/0013325 A1 | 1/2006 | Agrawal et al. | |
| 2006/0176966 A1 | 8/2006 | Stewart et al. | |
| 2008/0043613 A1 | 2/2008 | Yang et al. | |
| 2009/0290524 A1 | 11/2009 | Seok | |
| 2010/0054236 A1* | 3/2010 | Guvenc | H04W 4/20 370/350 |
| 2010/0118806 A1 | 5/2010 | Griot et al. | |
| 2012/0263108 A1 | 10/2012 | Ban et al. | |
| 2013/0022090 A1 | 1/2013 | Weng et al. | |
| 2013/0279614 A1 | 10/2013 | Walton et al. | |
| 2015/0063190 A1* | 3/2015 | Merlin | H04L 5/0037 370/312 |

OTHER PUBLICATIONS

LAN/MAN Standards Committee of the IEEE Computer Society, "IEEE Standard for Information technology—Telecommunications and information exchange between systems Local and metropolitan area networks—Specific requirements, Part 11: Wireless LAN Medium Access Control (MAC) and Physical Layer (PHY) Specifications, Amendment 4: Enhancements for Very High Throughput for Operation in Bands below 6 GHz," 2013.

LAN/MAN Standards Committee of the IEEE Computer Society, "IEEE Standard for Information technology—Telecommunications and information exchange between systems Local and metropolitan area networks—Specific requirements, Part 11: Wireless LAN Medium Access Control (MAC) and Physical Layer (PHY) Specifications," 2012.

* cited by examiner

SYSTEM AND METHOD FOR SYNCHRONIZATION FOR OFDMA TRANSMISSION

CROSS-REFERENCE TO RELATED APPLICATIONS

This application is a continuation of U.S. patent application Ser. No. 14/868,303, filed on Sep. 28, 2015, entitled "SYSTEM AND METHOD FOR SYNCHRONIZATION FOR OFDMA TRANSMISSION," which in turn claims the benefit of priority from U.S. Provisional Application No. 62/061,503, entitled "SYSTEM AND METHOD FOR SYNCHRONIZATION OF OFDMA TRANSMISSION," filed Oct. 8, 2014, each of which is incorporated herein by reference in its entirety.

TECHNICAL FIELD

The present description relates in general to wireless communication systems and methods, and more particularly to, for example, without limitation, systems and methods for synchronization for orthogonal frequency division multiple access (OFDMA) transmission.

BACKGROUND

Wireless local area network (WLAN) devices are deployed in diverse environments. These environments are generally characterized by the existence of access points and non-access point stations. Increased interference from neighboring devices gives rise to performance degradation. Additionally, WLAN devices are increasingly required to support a variety of applications such as video, cloud access, and offloading. In particular, video traffic is expected to be the dominant type of traffic in many high efficiency WLAN deployments. With the real-time requirements of some of these applications, WLAN users demand improved performance in delivering their applications, including improved power consumption for battery-operated devices.

The description provided in the background section should not be assumed to be prior art merely because it is mentioned in or associated with the background section. The background section may include information that describes one or more aspects of the subject technology.

Figure 1:
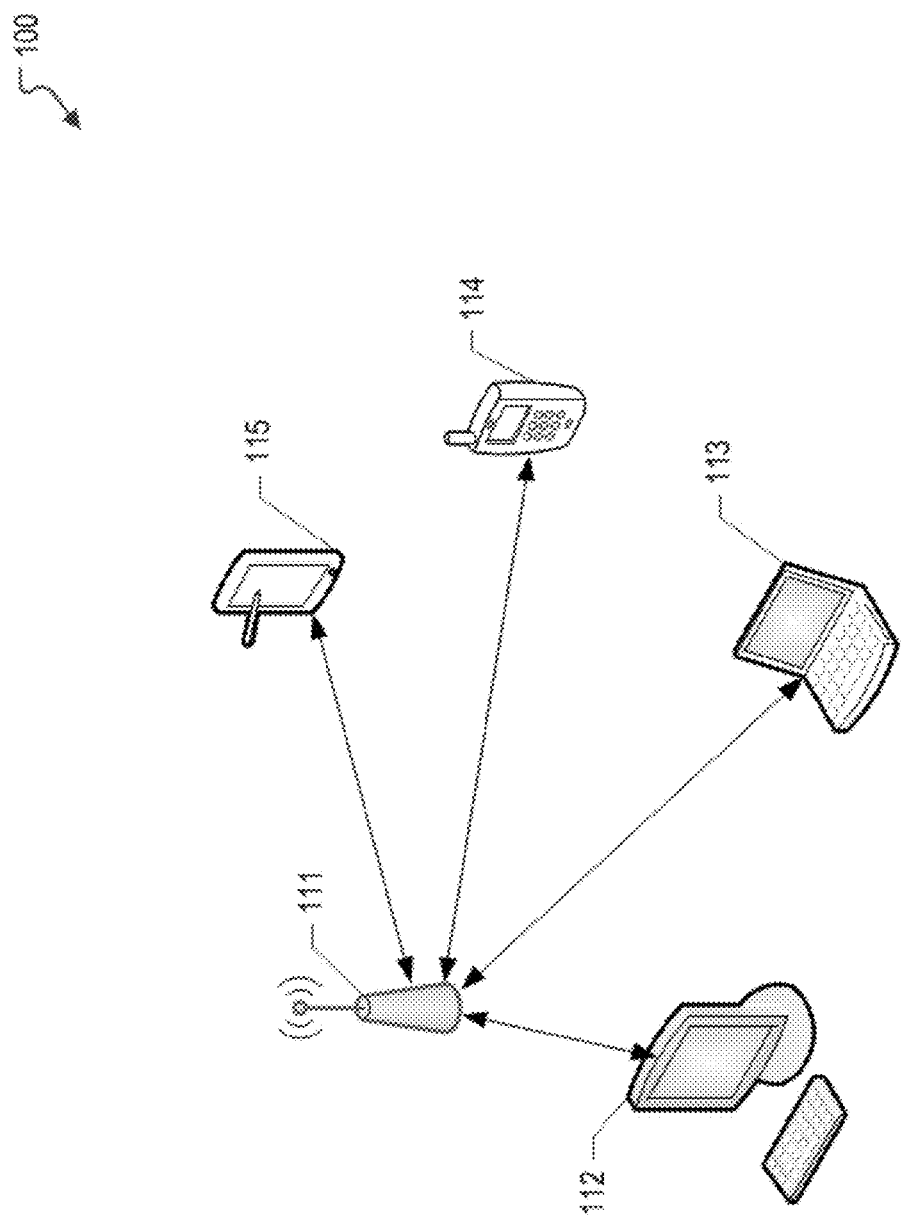
FIG. 1 illustrates a schematic diagram of an example of a wireless communication network.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

Multi-user (MU) transmission in next-generation WLAN systems include techniques such as downlink/uplink (DL/UL) MU multiple-input/multiple-output (MIMO) and DL/UL orthogonal frequency division multiple access (OFDMA). During the standardization activities of the Institute of Electrical and Electronics Engineers (IEEE) 802.11, Task Group ax, OFDMA technology is introduced to provide a multiple access scheme to improve network efficiency. OFDMA is a technology that allows multiple stations (STAs) to transmit frames simultaneously using non-overlapping frequency-time resources.

In OFDMA transmission, if frames transmitted by different stations are not synchronized at a receiver side (e.g., at an access point), the receiver may have difficulty correctly decoding the frames. In one or more aspects, a trigger frame may be utilized to facilitate maintaining of synchronization among the participating stations for MU simultaneous transmission in OFDMA.

In one or more aspects, a trigger frame may be a frame sent by an access point (AP) that seeks data, control, or management frame response(s) from stations that participate in a subsequent uplink (UL) MU frame. The trigger frame may be utilized to initiate the MU simultaneous transmission in OFDMA. By way of non-limiting example, a trigger frame may include some or all of the following features: (a) a list of STAs that an AP seeks a response from; (b) resource allocation information for each STA (e.g., a sub-band assigned to each STA); and/or (c) attributes of the expected UL MU frame, such as the duration, bandwidth, etc., among other features. The term "resource" may refer to, for example, bandwidth, time/duration that the STAs expect to occupy a transmission medium, and/or possibly a number of spatial streams that the STAs may use. In one or more aspects, a trigger frame may include information for a guard interval (GI) duration and/or the fast Fourier transform (FFT) size to be used for at least some symbols of an UL frame.

In one or more aspects, a data transmission procedure using a trigger frame may be provided as follows. An AP sends a trigger frame to participating STAs, where the trigger frame includes resource allocation information for the participating STAs. Each of the participating STAs may send its respective UL frame in its assigned resource at a predetermined time after receiving the trigger frame. Each of the participating STAs may monitor frames transmitted by the AP, such as beacon frames, and compensate frequency offset before the participating STA transmits its respective UL frame. For example, the participating STAs may perform frequency/time offset compensation by aligning their respective clock to a clock associated with the AP. The alignment of the clocks may also allow for time synchronization between the participating STAs and the AP. Accordingly, the trigger frame for the AP may facilitate time/frequency synchronization, which in turn may facilitate synchronization for OFDMA transmission.

In one or more implementations, in addition to time/frequency synchronization, each participating STA may be configured to use the same orthogonal frequency division multiplexing (OFDM) symbol duration as the other participating STAs to further facilitate synchronization of the OFDMA transmission. The configuring of the participating STAs may be based on information (e.g., from the AP) indicative of guard interval durations to be utilized by the participating STAs. The OFDM symbol duration of the participating STAs may be referred to as being aligned when the OFDM symbol duration is the same among the participating STAs. Conversely, if the STAs have different OFDM symbol durations from one another (e.g., the OFDM symbol durations are not aligned between the various STAs), a receiver of the OFDM symbols (e.g., the AP) may have greater difficulty correctly decoding the frames received from the STAs.

In one or more aspects, to maintain the same OFDM symbol duration among the participating STAs, the GI periods, associated with the OFDM symbols of the participating STAs, are aligned. In one or more aspects, mechanisms are provided to enable all participating STAs to use the same GI duration (or the same OFDM symbol duration).

In one or more implementations, a method is provided for aligning the OFDM symbol durations from multiple STAs based on setting a guard interval utilized by the participating STAs. The aligning of the OFDM symbol durations allows synchronization of OFDM symbol boundaries when the multiple STAs transmit frames simultaneously, such as for OFDMA transmission. In some aspects, the aligning of the OFDM symbol durations of multiple STAs may be referred to as aligning the OFDM symbol boundaries of the multiple STAs, synchronizing the OFDM symbols of the multiple STAs, or synchronizing the OFDM symbol boundaries of the multiple STAs.

In one or more implementations, the method may include receiving at a first station a first frame (e.g., a downlink frame), where the first frame includes information on resource allocation that the first station is scheduled to transmit a frame (e.g., an uplink frame). The method may further include sending, by the first station, a second frame (e.g., an uplink frame), where the guard interval of each OFDM symbol of a portion (e.g., a payload portion) of the second frame is the same as that of a portion (e.g., the payload portion) of the first frame.

In one aspect, each of the first and second frames includes a respective first part and a respective second part. A guard interval duration associated with the second part of the second frame may be based on information (e.g., a value) contained in the first frame that is indicative of the guard interval duration.

In some aspects, the first part of the first frame is associated with a first FFT size, and the second part of the first frame is associated with a second FFT size different from the first FFT size. In some aspects, the first part of the second frame is associated with a third FFT size, and the second part of the second frame is associated with a fourth FFT size different from the third FFT size. In one aspect, the third FFT size is the same as the first FFT size. In one aspect, the fourth FFT size is the same as the second FFT size.

FIG. 1 illustrates a schematic diagram of an example of a wireless communication network 100. In the wireless communication network 100, such as a wireless local area network (WLAN), a basic service set (BSS) includes a plurality of wireless communication devices (e.g., WLAN devices). In one aspect, a BSS refers to a set of STAs that can communicate in synchronization, rather than a concept indicating a particular area. In the example, the wireless communication network 100 includes wireless communication devices 111-115, which may be referred to as stations (STAs).

Each of the wireless communication devices 111-115 may include a media access control (MAC) layer and a physical (PHY) layer according to an IEEE 802.11 standard. In the example, at least one wireless communication device (e.g., device 111) is an access point (AP). An AP may be referred to as an AP STA or an AP device. The other wireless communication devices (e.g., devices 112-115) may be non-AP STAs. Alternatively, all of the wireless communication devices 111-115 may be non-AP STAs in an Ad-hoc networking environment.

An AP STA and a non-AP STA may be collectively called STAs. However, for simplicity of description, in some aspects, only a non-AP STA may be referred to as a STA. An AP may be, for example, a centralized controller, a base station (BS), a node-B, a base transceiver system (BTS), a site controller, a network adapter, a network interface card (NIC), a router, or the like. An non-AP STA (e.g., a client device operable by a user) may be, for example, a device with wireless communication capability, a terminal, a wireless transmit/receive unit (WTRU), a user equipment (UE), a mobile station (MS), a mobile terminal, a mobile subscriber unit, a laptop, a non-mobile computing device (e.g., a desktop computer with wireless communication capability) or the like. In one or more aspects, a non-AP STA may act as an AP (e.g., a wireless hotspot).

In one aspect, an AP is a functional entity for providing access to a distribution system, by way of a wireless medium, for an associated STA. For example, an AP may provide access to the internet for one or more STAs that are wirelessly and communicatively connected to the AP. In FIG. 1, wireless communications between non-AP STAs are made by way of an AP. However, when a direct link is established between non-AP STAs, the STAs can communicate directly with each other (without using an AP).

In one or more implementations, OFDMA-based 802.11 technologies are utilized, and for the sake of brevity, a STA refers to a non-AP HE STA, and an AP refers to a HE AP. In one or more aspects, a STA may act as an AP.

Figure 2:
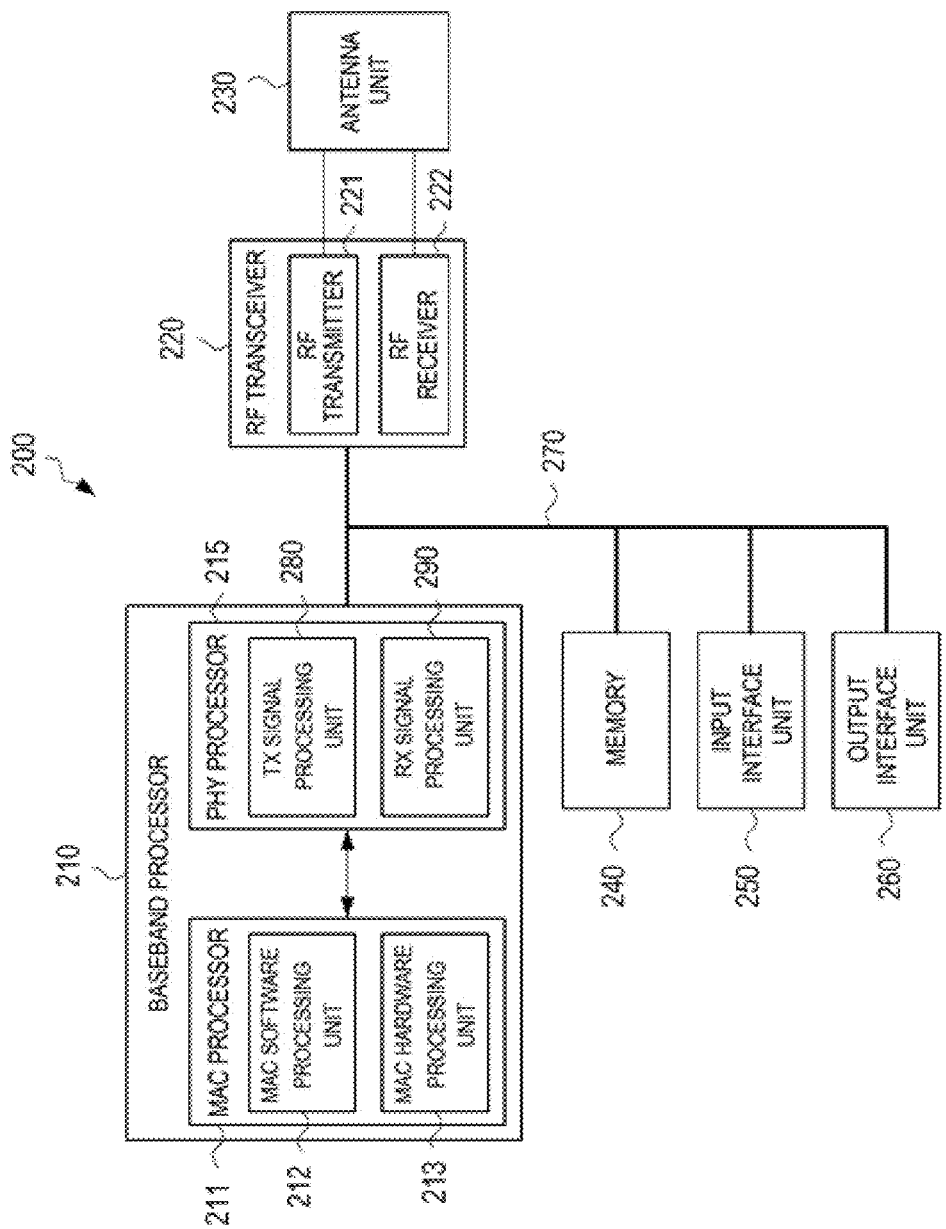
FIG. 2 illustrates a schematic diagram of an example of a wireless communication device.

FIG. 2 illustrates a schematic diagram of an example of a wireless communication device. The wireless communication device 200 includes a baseband processor 210, a radio frequency (RF) transceiver 220, an antenna unit 230, a memory 240, an input interface unit 250, an output interface unit 260, and a bus 270, or subsets and variations thereof. The wireless communication device 200 can be, or can be a part of, any of the wireless communication devices 111-115.

In the example, the baseband processor 210 performs baseband signal processing, and includes a medium access control (MAC) processor 211 and a PHY processor 215. The memory 240 may store software (such as MAC software) including at least some functions of the MAC layer. The memory may further store an operating system and applications.

In the illustration, the MAC processor 211 includes a MAC software processing unit 212 and a MAC hardware processing unit 213. The MAC software processing unit 212 executes the MAC software to implement some functions of the MAC layer, and the MAC hardware processing unit 213 may implement remaining functions of the MAC layer as hardware (MAC hardware). However, the MAC processor 211 may vary in functionality depending on implementation. The PHY processor 215 includes a transmitting (TX) signal processing unit 280 and a receiving (RX) signal processing unit 290. The term TX may refer to transmitting, transmit, transmitted, transmitter or the like. The term RX may refer to receiving, receive, received, receiver or the like.

The PHY processor 215 interfaces to the MAC processor 211 through, among others, transmit vector (TXVECTOR) and receive vector (RXVECTOR) parameters. In one or more aspects, the MAC processor 211 generates and provides TXVECTOR parameters to the PHY processor 215 to supply per-packet transmit parameters. In one or more aspects, the PHY processor 215 generates and provides RXVECTOR parameters to the MAC processor 211 to inform the MAC processor 211 of the received packet parameters.

In some aspects, the wireless communication device 200 includes a read-only memory (ROM) (not shown) or registers (not shown) that store instructions that are needed by one or more of the MAC processor 211, the PHY processor 215 and/or other components of the wireless communication device 200.

In one or more implementations, the wireless communication device 200 includes a permanent storage device (not shown) configured as a read-and-write memory device. The permanent storage device may be a non-volatile memory unit that stores instructions even when the wireless communication device 200 is off. The ROM, registers and the permanent storage device may be part of the baseband processor 210 or be a part of the memory 240. Each of the ROM, the permanent storage device, and the memory 240 may be an example of a memory or a computer-readable medium. A memory may be one or more memories.

The memory 240 may be a read-and-write memory, a read-only memory, a volatile memory, a non-volatile memory, or a combination of some or all of the foregoing. The memory 240 may store instructions that one or more of the MAC processor 211, the PHY processor 215, and/or another component may need at runtime.

The RF transceiver 220 includes an RF transmitter 221 and an RF receiver 222. The input interface unit 250 receives information from a user, and the output interface unit 260 outputs information to the user. The antenna unit 230 includes one or more antennas. When multi-input multi-output (MIMO) or multi-user MIMO (MU-MIMO) is used, the antenna unit 230 may include more than one antenna.

The bus 270 collectively represents all system, peripheral, and chipset buses that communicatively connect the numerous internal components of the wireless communication device 200. In one or more implementations, the bus 270 communicatively connects the baseband processor 210 with the memory 240. From the memory 240, the baseband processor 210 may retrieve instructions to execute and data to process in order to execute the processes of the subject disclosure. The baseband processor 210 can be a single processor, multiple processors, or a multi-core processor in different implementations. The baseband processor 210, the memory 240, the input interface unit 250, and the output interface unit 260 may communicate with each other via the bus 270.

The bus 270 also connects to the input interface unit 250 and the output interface unit 260. The input interface unit 250 enables a user to communicate information and select commands to the wireless communication device 200. Input devices that may be used with the input interface unit 250 may include any acoustic, speech, visual, touch, tactile and/or sensory input device, e.g., a keyboard, a pointing device, a microphone, or a touchscreen. The output interface unit 260 may enable, for example, the display or output of videos, images, audio, and data generated by the wireless communication device 200. Output devices that may be used with the output interface unit 260 may include any visual, auditory, tactile, and/or sensory output device, e.g., printers and display devices or any other device for outputting information. One or more implementations may include devices that function as both input and output devices, such as a touchscreen.

One or more implementations can be realized in part or in whole using a computer-readable medium. In one aspect, a computer-readable medium includes one or more media. In one or more aspects, a computer-readable medium is a tangible computer-readable medium, a computer-readable storage medium, a non-transitory computer-readable medium, a machine-readable medium, a memory, or some combination of the foregoing (e.g., a tangible computer-readable storage medium, or a non-transitory machine-readable storage medium). In one aspect, a computer is a machine. In one aspect, a computer-implemented method is a machine-implemented method.

A computer-readable medium may include storage integrated into a processor and/or storage external to a processor. A computer-readable medium may be a volatile, non-volatile, solid state, optical, magnetic, and/or other suitable storage device, e.g., RAM, ROM, PROM, EPROM, a flash, registers, a hard disk, a removable memory, or a remote storage device.

In one aspect, a computer-readable medium comprises instructions stored therein. In one aspect, a computer-readable medium is encoded with instructions. In one aspect, instructions are executable by one or more processors (e.g., 210, 211, 212, 213, 215, 280, 290) to perform one or more operations or a method. Instructions may include, for example, programs, routines, subroutines, data, data structures, objects, sequences, commands, operations, modules, applications, and/or functions. Those skilled in the art would recognize how to implement the instructions.

A processor (e.g., 210, 211, 212, 213, 215, 280, 290) may be coupled to one or more memories (e.g., one or more external memories such as the memory 240, one or more memories internal to the processor, one or more registers internal or external to the processor, or one or more remote memories outside of the device 200), for example, via one or more wired and/or wireless connections. The coupling may be direct or indirect. In one aspect, a processor includes one or more processors. A processor, including a processing circuitry capable of executing instructions, may read, write, or access a computer-readable medium. A processor may be, for example, an application specific integrated circuit (ASIC), a digital signal processor (DSP), or a field programmable gate array (FPGA).

In one aspect, a processor (e.g., 210, 211, 212, 213, 215, 280, 290) is configured to cause one or more operations of the subject disclosure to occur. In one aspect, a processor is configured to cause an apparatus (e.g., a wireless communication device 200) to perform operations or a method of the subject disclosure. In one or more implementations, a processor configuration involves having a processor coupled to one or more memories. A memory may be internal or external to the processor. Instructions may be in a form of software, hardware or a combination thereof. Software instructions (including data) may be stored in a memory. Hardware instructions may be part of the hardware circuitry components of a processor. When the instructions are executed or processed by one or more processors, (e.g., 210, 211, 212, 213, 215, 280, 290), the one or more processors cause one or more operations of the subject disclosure to occur or cause an apparatus (e.g., a wireless communication device 200) to perform operations or a method of the subject disclosure.

Figure 3:
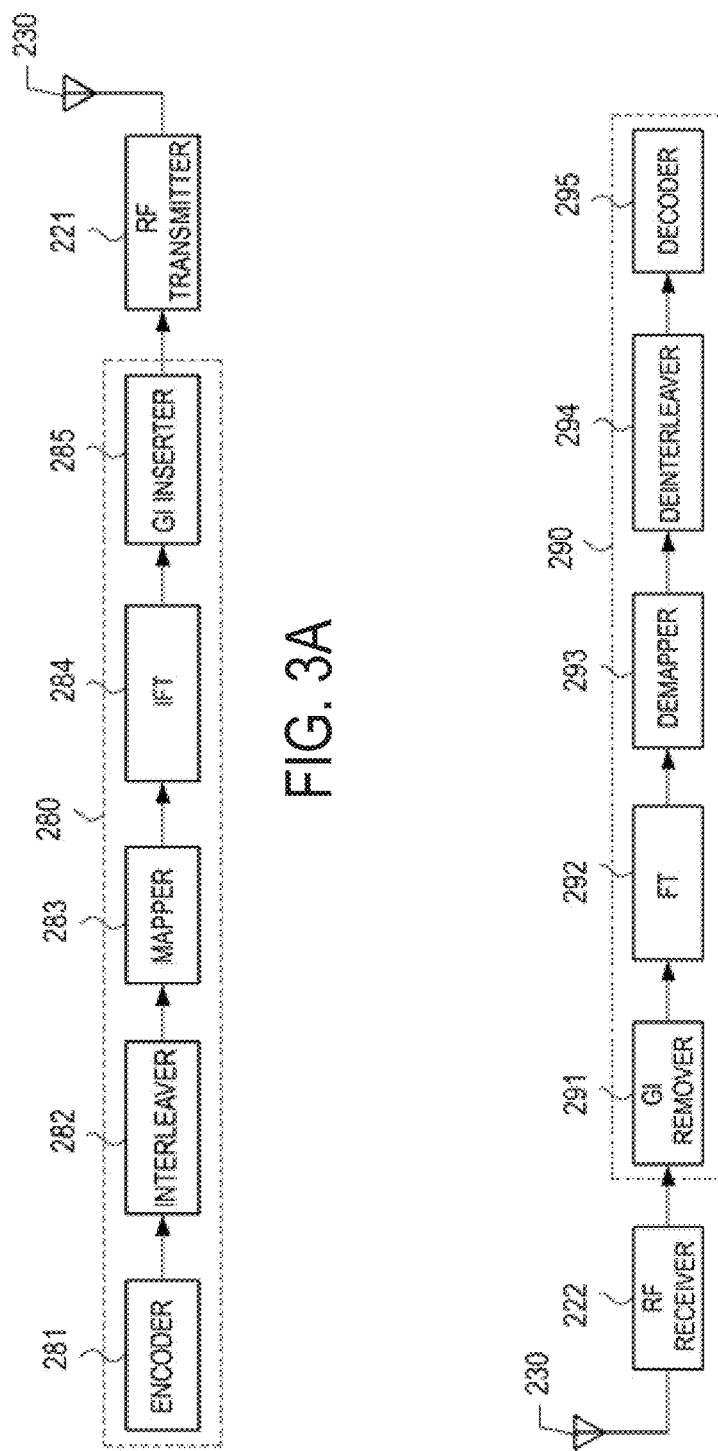
FIG. 3A illustrates a schematic block diagram of an example of a transmitting signal processor in a wireless communication device.
FIG. 3B illustrates a schematic block diagram of an example of a receiving signal processor in a wireless communication device.

FIG. 3A illustrates a schematic block diagram of an example of a transmitting signal processing unit 280 in a wireless communication device. The transmitting signal processing unit 280 of the PHY processor 215 includes an encoder 281, an interleaver 282, a mapper 283, an inverse Fourier transformer (IFT) 284, and a guard interval (GI) inserter 285.

The encoder 281 encodes input data. For example, the encoder 281 may be a forward error correction (FEC) encoder. The FEC encoder may include a binary convolutional code (BCC) encoder followed by a puncturing device, or may include a low-density parity-check (LDPC) encoder. The interleaver 282 interleaves the bits of each stream output from the encoder 281 to change the order of bits. In one aspect, interleaving may be applied only when BCC encoding is employed. The mapper 283 maps the sequence of bits output from the interleaver 282 into constellation points.

When MIMO or MU-MIMO is employed, the transmitting signal processing unit 280 may use multiple instances of the interleaver 282 and multiple instances of the mapper 283 corresponding to the number of spatial streams ($N_{SS}$). In the example, the transmitting signal processing unit 280 may further include a stream parser for dividing outputs of the BCC encoders or the LDPC encoder into blocks that are sent to different interleavers 282 or mappers 283. The transmitting signal processing unit 280 may further include a space-time block code (STBC) encoder for spreading the constellation points from the number of spatial streams into a number of space-time streams ($N_{STS}$) and a spatial mapper for mapping the space-time streams to transmit chains. The spatial mapper may use direct mapping, spatial expansion, or beamforming depending on implementation. When MU-MIMO is employed, one or more of the blocks before reaching the spatial mapper may be provided for each user.

The IFT 284 converts a block of the constellation points output from the mapper 283 or the spatial mapper into a time domain block (e.g., a symbol) by using an inverse discrete Fourier transform (IDFT) or an inverse fast Fourier transform (IFFT). If the STBC encoder and the spatial mapper are employed, the IFT 284 may be provided for each transmit chain.

When MIMO or MU-MIMO is employed, the transmitting signal processing unit 280 may insert cyclic shift diversities (CSDs) to prevent unintentional beamforming. The CSD insertion may occur before or after the inverse Fourier transform operation. The CSD may be specified per transmit chain or may be specified per space-time stream. Alternatively, the CSD may be applied as a part of the spatial mapper.

The GI inserter 285 prepends a GI to the symbol. The transmitting signal processing unit 280 may optionally perform windowing to smooth edges of each symbol after inserting the GI. The RF transmitter 221 converts the symbols into an RF signal and transmits the RF signal via the antenna unit 230. When MIMO or MU-MIMO is employed, the GI inserter 285 and the RF transmitter 221 may be provided for each transmit chain.

FIG. 3B illustrates a schematic block diagram of an example of a receiving signal processing unit 290 in a wireless communication device. The receiving signal processing unit 290 of the PHY processor 215 includes a GI remover 291, a Fourier transformer (FT) 292, a demapper 293, a deinterleaver 294, and a decoder 295.

The RF receiver 222 receives an RF signal via the antenna unit 230 and converts the RF signal into one or more symbols. In some aspects, the GI remover 291 removes the GI from the symbol. When MIMO or MU-MIMO is employed, the RF receiver 222 and the GI remover 291 may be provided for each receive chain.

The FT 292 converts the symbol (e.g., the time domain block) into a block of the constellation points by using a discrete Fourier transform (DFT) or a fast Fourier transform (FFT) depending on implementation. In one or more implementations, the FT 292 is provided for each receive chain.

When MIMO or MU-MIMO is employed, the receiving signal processing unit 290 may be a spatial demapper for converting the Fourier transformed receiver chains to constellation points of the space-time streams, and a STBC decoder (not shown) for despreading the constellation points from the space-time streams into the spatial streams.

The demapper 293 demaps the constellation points output from the FT 292 or the STBC decoder to the bit streams. If the LDPC encoding is used, the demapper 293 may further perform LDPC tone demapping before the constellation demapping. The deinterleaver 294 deinterleaves the bits of each stream output from the demapper 293. In one or more implementations, deinterleaving may be applied only when BCC encoding is used.

When MIMO or MU-MIMO is employed, the receiving signal processing unit 290 may use multiple instances on the demapper 293 and multiple instances of the deinterleaver 294 corresponding to the number of spatial streams. In the example, the receiving signal processing unit 290 may further include a stream deparser for combining the streams output from the deinterleavers 294.

The decoder 295 decodes the streams output from the deinterleaver 294 and/or the stream deparser. For example, the decoder 295 may be an FEC decoder. The FEC decoder may include a BCC decoder or an LDPC decoder.

Figure 4:
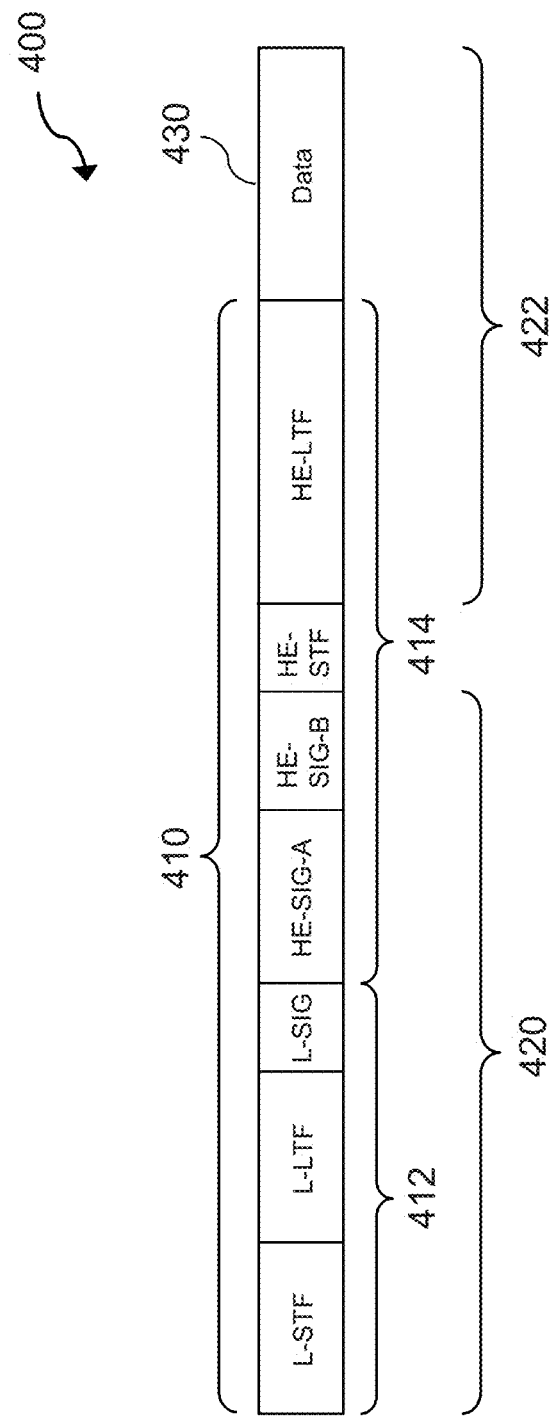
FIG. 4 illustrates an example of a high efficiency frame.

FIG. 4 illustrates an example of a high efficiency (HE) frame 400. The HE frame 400 is a physical layer convergence procedure (PLCP) protocol data unit (or PPDU) format. An HE frame may be referred to as an OFDMA frame, a PPDU, an OFDMA PPDU, an MU PPDU, another similar term, or vice versa. An HE frame may be simply referred to as a frame for convenience.

An AP may transmit a frame for downlink (DL) using a frame format shown in this figure or a variation thereof. A STA may transmit a frame for uplink (UL) using a frame format shown in this figure or a variation thereof (e.g., without any or some portions of an HE header 414). In one or more aspects, the frames shown in FIGS. 5 through 8 may utilize a frame format shown in FIG. 4 or a variation thereof.

Referring to FIG. 4, the HE frame 400 contains a header 410 and a payload 430. The header 410 includes a legacy header 412 comprised of a legacy short training field (L-STF), a legacy long training field (L-LTF), and a legacy signal (L-SIG) field. These legacy fields contain symbols based on an early design of an IEEE 802.11 specification. Presence of these symbols would make any new design compatible with the legacy designs and products.

In one or more implementations, the legacy STF, LTF, and SIG symbols are modulated/carried with FFT size of 64 on a 20 MHz sub-channel and are duplicated every 20 MHz if the frame has a channel bandwidth wider than 20 MHz. Therefore, the legacy field (i.e., the STF, LTF, and SIG fields) occupies the entire channel bandwidth of the frame. The L-STF field may be utilized for packet detection, automatic gain control (AGC), and coarse frequency-offset correction. The L-LTF field may be utilized for channel estimation, fine frequency-offset correction, and symbol timing.

The header 410 may include an HE header 414 comprised of an HE-SIG-A field and an HE-SIG-B field. These fields contain symbols that carry control information that may be vital regarding each PLCP service data unit (PSDU) and regarding the radio frequency (RF), PHY, and MAC properties of a PPDU. Several sub-fields may be located either in the HE-SIG-A and/or HE-SIG-B fields. In one aspect, the HE-SIG-A field can be carried/modulated using an FFT size of 64 for 20 MHz channel bandwidth. The HE-SIG-B field can be carried/modulated using an FFT size of e.g., 64 or 256 depending on implementation. The HE-SIG-A and HE-SIG-B fields may occupy the entire channel bandwidth of the frame. In some aspects, the size of the HE-SIG-B field is variable. In other words, the number of symbols contained in the HE-SIG-B field can vary from frame to frame. For example, the number of symbols in the HE-SIG-B field may be one symbol, two symbols, zero symbols, among other possibilities. In this regard, a HE-SIG-B field is not always present in all frames. To facilitate decoding of the HE frame 400 by a receiver, the size (e.g., number of symbols) contained in the HE-SIG-B field may be indicated in the HE-SIG-A field.

For a 20 MHz channel, an FFT size of 64 is associated with a discrete Fourier transform (DFT) period of 3.2 μs and a subcarrier spacing of 312.5 kHz. For a 20 MHz channel, an FFT size of 256 is associated with a DFT period of 12.8 μs and a subcarrier spacing of 78.125 kHz. The DFT period may also be referred to as an inverse DFT period (IDFT) or an IDFT/DFT period. The DFT period may be denoted as $T_{DFT}$. The subcarrier spacing may be referred to as a subcarrier frequency spacing and may be denoted as $\Delta_F$. The subcarrier spacing may be obtained by dividing the channel bandwidth by the FFT size. The DFT period is the reciprocal of the subcarrier spacing.

The HE header 414 may further include HE-STF and HE-LTF fields, which contain symbols used to perform necessary RF and PHY processing for each PSDU and/or for the whole PPDU. The HE-LTF symbols may be modulated/carried with FFT size of 256 per 20 MHz channel bandwidth and modulated over the entire bandwidth of the frame. Thus, the HE-LTF field may occupy the entire channel bandwidth of the frame. The HE-STF symbols may have a fixed pattern and a fixed duration. For example, the HE-STF symbols may have a predetermined repeating pattern. In one aspect, the HE-STF symbols do not require FFT processing.

In one example, the legacy STF, LTF, and SIG symbols and the HE-SIG-A and HE-SIG-B symbols are modulated/carried with FFT size of 64 on a 20 MHz channel (e.g., using a DFT period of 3.2 μs and a subcarrier spacing of 312.5 kHz), whereas the HE-LTF symbols are modulated/carried with FFT size of 256 on a 20 MHz channel (e.g., using a DFT period of 12.8 μs and a subcarrier spacing of 78.125 kHz). In such implementations, a first part 420 of the HE frame 400 may include the legacy STF, LTF and SIG symbols and the HE-SIG-A and HE-SIG-B symbols. A second part 422 of the HE frame 400 may include HE-LTF symbols. The HE-STF symbols may be a known predetermined pattern that does not require FFT processing. Thus, the HE-STF symbols may be considered separate from the first part 420 and the second part 422 of the HE frame 400. In one aspect, the payload 430 (containing data) is modulated/carried with FFT size of 256 (e.g., using a DFT period of 12.8 μs and a subcarrier spacing of 78.125 kHz), and the payload 430 may be included in the second part 422 of the HE frame 400.

In one or more aspects, the first part 420 of the HE frame 400 is associated with a first FFT size, and the second part 422 of the HE frame 400 is associated with a second FFT size that is greater (or larger) than the first FFT size. In one or more aspects, the first part 420 of the HE frame 400 is associated with a first subcarrier spacing (e.g., 312.5 kHz), and the second part 422 of the HE frame 400 is associated with a second subcarrier spacing (e.g., 78.125 kHz) that is less than the first subcarrier spacing. In one aspect, a subcarrier spacing is a spacing between tones (or between subcarriers). In one or more aspects, the boundary of a first part and a second part of an HE frame 400 can be placed at a location other than the location shown in FIG. 4. For example, the second part may start at the beginning of the payload 430. In one aspect, a first part of an HE frame 400 always includes at least the legacy header (i.e., the L-STF, L-LTF, and L-SIG symbols).

In one or more aspects, additional one or more of the HE-STF and/or HE-LTF fields may be included in the header 410. For example, an additional HE-STF field and/or an additional HE-LTF field may be included between the HE-SIG-A field and the HE-SIG-B field. The additional HE-STF and HE-LTF fields may be, for example, modulated/carried with FFT size of 64 on a 20 MHz channel and may be included as part of the first part 420 of the HE frame 400. In one or more implementations, a TX signal processing unit 280 (or an IFT 284) illustrated in FIG. 3A may carry out the modulation described in this paragraph as well as the modulations described in other paragraphs above. In one or more implementations, an RX signal processing unit 290 (or an FT 292) may perform demodulation for a receiver.

The horizontal dimension in FIG. 4 represents the time dimension or number of OFDM symbols. Each of the fields (e.g., L-LTF, HE-SIG-B, etc.) of the HE frame 400 includes one or more guard intervals and one or more OFDM symbols. The guard interval may be utilized to facilitate compensation of multi-path effects, which may cause inter-symbol interference (ISI). In one or more implementations, a guard interval is a cyclic prefix (CP), and a guard interval duration is a CP length. A guard interval associated with the first part 420 of the HE frame may be predetermined to be, and set to, for example, 0.8 μs. In one aspect, a guard interval for each of a legacy OFDM symbol in the legacy header in the first part 420 is set to, for example, 0.8 μs. Each guard interval may be associated with a symbol and may be present between symbols (or between consecutive symbols). In some aspects, each OFDM symbol is preceded by a guard interval.

In one aspect, multiple guard intervals may be represented as one long guard interval, and such long guard interval may precede the OFDM symbols associated with the multiple guard intervals. For example, a guard interval of 1.6 μs (representing two guard intervals, each being 0.8 μs) may be prepended to two consecutive OFDM symbols associated with the two guard intervals.

In one or more implementations of a transmitter, a GI inserter 285 illustrated in FIG. 3A may prepend a guard interval to an OFDM symbol. For a receiver, a GI remover 291 of FIG. 3B may remove the prepended guard interval. As used herein, the term "OFDM symbol duration" or "symbol duration" may refer to a sum of a duration of a guard interval and a duration of an OFDM symbol associated with the guard interval, rather than the duration of the OFDM symbol itself, e.g., without the duration of the guard interval.

In some aspects, a guard interval duration utilized in the first part 420 of the HE frame 400 is predetermined for all UL and DL transmissions associated with OFDMA. In some aspects, information regarding the guard interval duration (e.g., a value of the guard interval duration) utilized for the second part 422 of the HE frame 400 may be stored in an HE-SIG-A field of the HE frame 400. The inclusion of the guard interval duration may facilitate decoding of the HE frame 400 by a receiver of the HE frame 400 by allowing the receiver to determine boundaries between adjacent symbols in the second part 422 of the HE frame 420 based on the guard interval duration. For example, a receiver of the HE frame 400 may decode the first part 420 of the HE frame 400 based on the predetermined guard interval duration to obtain the information indicative of the guard interval duration utilized for the second part 422 of the HE frame 400. With the information, the receiver may decode the second part 422 of the HE frame 400.

Figure 5:
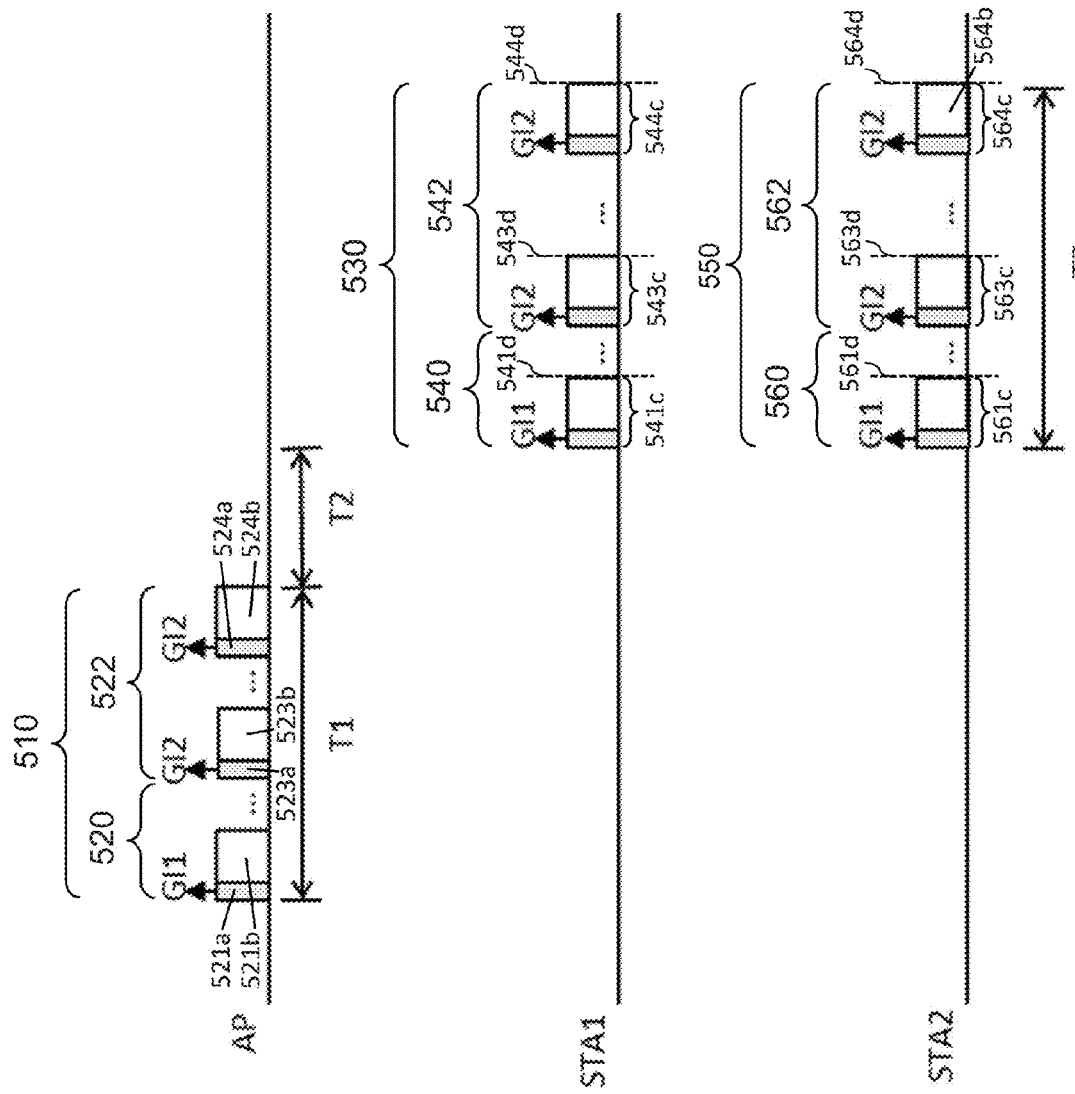
FIG. 5 illustrates a schematic diagram of an example of an exchange of frames among wireless communication devices for OFDMA transmission.

FIG. 5 illustrates a schematic diagram of an example of an exchange of frames among wireless communication devices for OFDMA transmission. One or more aspects of aligning GI duration of all participating stations of OFDMA transmission are illustrated. The horizontal dimension in FIG. 5 represents the time dimension or number of OFDM symbols. The wireless communication devices include an AP, a participating station STA1, and a participating station STA2. Although FIG. 5 illustrates an exchange of frames between an AP and two stations participating in OFDMA transmission, the exchange of frames may be between the AP and one participating station (e.g., the non-OFDMA case) or between the AP and more than two participating stations.

In FIG. 5, the AP sends a downlink frame 510 to the participating stations (e.g., STA1 and STA2) during a time period T1. The downlink frame 510 is utilized to initiate OFDMA transmission. For example, the downlink frame 510 may be a trigger frame. The downlink frame 510 may provide, for example, a transmission opportunity to the participating stations and may indicate resource allocation information for the participating stations pertaining to OFDMA transmission. For example, the resource allocation information may include a sub-band assigned to a respective one of the participating stations as well as scheduling information regarding when a respective one of the participating stations may transmit using its assigned sub-band. For instance, when there are four STAs, and the uplink channel bandwidth is, for example, 80 MHz, then the AP may assign a sub-band of the uplink channel bandwidth (e.g., a portion of 80 MHz) to each respective STA so that each STA has its assigned sub-band. The downlink frame 510 may also include other information, such as FFT/IFFT period information.

The downlink frame 510 includes a first part 520 and a second part 522. In one or more implementations, the first part 520 and the second part 522 of the downlink frame 510 may be (or may include, or may be a part of) the first part 420 and the second part 422, respectively, of the frame 400 described with reference to FIG. 4. The downlink frame 510 may include an HE-STF field that is in between the first part 520 and the second part 522 of the downlink frame 510. Each guard interval (GI) of the first part 520 of the downlink frame 510 may be set at a predetermined guard interval duration GI1. The guard interval duration GI1 may be predetermined for all DL and/or UL transmissions. For example, the guard interval duration GI1 may be set to 0.8 μs regardless of using a short guard interval for the second part 522. The AP may utilize a guard interval duration GI2 for the rest of the downlink frame 510. The rest of the downlink frame 510 may include, for example, the HE-STF field and the second part 522 of the downlink frame 510.

For example, a guard interval 521*a* having the guard interval duration GI1 may be prepended to a symbol 521*b* of the first part 520 of the downlink frame 510. A symbol duration may be the sum of the duration of the guard interval 521*a* and the duration of the symbol 521*b*. For brevity, additional guard intervals and their associated symbols present in the first part 520 are not shown.

Guard interval 523*a* and 524*a*, each having the guard interval duration GI2, may be prepended to their respective symbols 523*b* and 524*b* of the second part 522 of the downlink frame 510. Additional guard intervals and symbols that are present in the second part 522 are not shown for brevity. Information on the guard interval duration GI2 (e.g., a value representing GI2) may be stored in the first part 520 of the downlink frame 510, such as in an HE-SIG-A field, and may be utilized by a receiver of the downlink frame 510 to determine, e.g., for decoding purposes, that the second part 522 of the downlink frame 510 utilizes guard intervals of the guard interval duration GI2.

When the participating stations receive the downlink frame 510 transmitted by the AP, the participating stations may decode the downlink frame 510 and identify that the participating stations are supposed to transmit their respective frames to the AP after a specified time period (e.g., T2) after the participating stations received the frame 510. From the perspective of the AP, the predetermined time period T2 may be from the end of the transmission of the frame 510 (e.g., the end of the time period T1). After the predetermined time period T2, the participating stations send their respective uplink frames 530 and 550 to the AP during a time period T3 in response to the downlink frame 510. The time period T2 may be around 6 μs to around 60 μs for example. In some aspects, the time period T2 may be a short interface space (SIFS). In FIG. 5, the uplink frames 530 and 550 have a time duration equal to the time period T3. In other words, in one aspect, every UL OFDMA participating STA has the same frame length. In some cases, one or both of the uplink frames 530 and 550 may be of a time duration less than or greater than the time period T3. The uplink frame 530 may include a different number of symbols from the uplink frame 550. In one aspect, an uplink frame may include additional guard intervals and symbols beyond those shown in this figure (e.g., additional guard intervals and symbols after the symbol 564*b*).

When the participating stations transmit the uplink frames 530 and 550 as part of OFDMA transmission, the participating stations use the predetermined guard interval duration GI1 for the first parts 540 and 560 of their respective frames 530 and 550 and use the same guard interval duration GI2, which is used in the second part 522 of the downlink frame 510, for the second parts 542 and 562 of their respective uplink frames 530 and 550. The uplink frames 530 and 550 may include a respective HE-STF field that is in between the first parts 540 and 560 and the second parts 542 and 562 of the respective uplink frames frame 530 and 550. In one aspect, the HE-STF field does not utilize any guard interval. As the guard interval duration GI2 is included in the downlink frame 510 for decoding purposes, no additional overhead is used in the downlink frame 510 to indicate the guard interval duration to be used by the participating stations in the second parts 542 and 562 of their respective uplink frames 530 and 550.

In one or more implementations, the AP may set the guard interval duration based on a communication environment. The communication environment utilized by the AP to determine the guard interval duration GI2 may include multi-path delay profile of a received signal, different propagation delay to and from multiple different stations (e.g., the participating stations), accuracy of timing alignment capabilities of the participating stations, and so on. For example, the participating stations may reside at different distances from the AP and/or in different environments (e.g., altitudes, atmosphere, density of buildings, temperature, etc.) such that propagation delay is different among the participating stations. The received signal may be a signal received at the stations, such as when the stations receive a signal transmitted to the stations by the AP. The received signal may be a signal received at the AP, such as when the AP receives a signal transmitted to the AP by the stations. In some cases, the guard interval duration GI2 is the same as the guard interval duration GI1. In other cases, the guard interval duration GI2 is different from the guard interval duration GI1.

In some aspects, the AP sets the guard interval duration GI2 to better accommodate the different propagation delays associated with the different stations. The AP may set the guard interval duration to a longer duration allowed by the IEEE 802.11 protocol to better accommodate the different propagation delays. For example, the AP may set the guard interval duration GI2 to a longest guard interval duration allowed by the IEEE 802.11 protocol (e.g., 3.2 μs). The use of a longer guard interval may allow the participating stations to synchronize the symbol duration, and the frames sent from the participating stations can avoid inter-symbol interferences caused, for example, by the propagation delay differences among participating stations.

In one or more implementations, the guard interval duration GI1 utilized by the first part (e.g., 520, 540, and 560) of the downlink frame 510 and the uplink frames 530 and 550 are predetermined (e.g., predetermined before the AP begins to create/prepare the downlink frame 510) such that APs and STAs participating in UL and DL OFDMA transmission throughout a network (e.g., an IEEE 802.1 lax-compliant network) utilize the guard interval duration GI1 for the first parts of their respective frames. A guard interval duration to be utilized for the guard interval duration GI2 may be adaptively determined by an AP. For example, the AP may adjust the guard interval duration GI2 based on changes in the communication environment. The definition of the guard interval durations to be used in the uplink frames (e.g., 530 and 550) of the participating stations allow synchronization of OFDM symbol boundaries of the uplink frames, since the OFDM symbol durations contained in the uplink frames are the same for each participating station. Although the number of symbols contained in the uplink frames (e.g., the number of symbols in the frame 530 compared to the number of symbols in the frame 550) may be different, the respective OFDM symbol durations remain the same for the uplink frames.

In one or more aspects, the respective symbol durations of the uplink frames are the same, and the respective symbol boundaries are aligned. For example, a symbol duration 541c is the same as a symbol duration of 561c. A symbol duration 543c is the same as a symbol duration 563c. A symbol duration 544c is the same as a symbol duration 564c. Furthermore, a symbol boundary 541d is aligned with a symbol boundary of 561d. A symbol boundary 543d is aligned with a symbol boundary 563d. A symbol boundary 544d is aligned with a symbol boundary 564d.

In one or more implementations, the first part (e.g., 540 or 560) and the second part (e.g., 542 or 562) of an uplink frame (e.g., 530 or 560) may be (or may include, or may be a part of) the first part 420 and the second part 422, respectively, of the frame 400 described with reference to FIG. 4.

Figure 6:
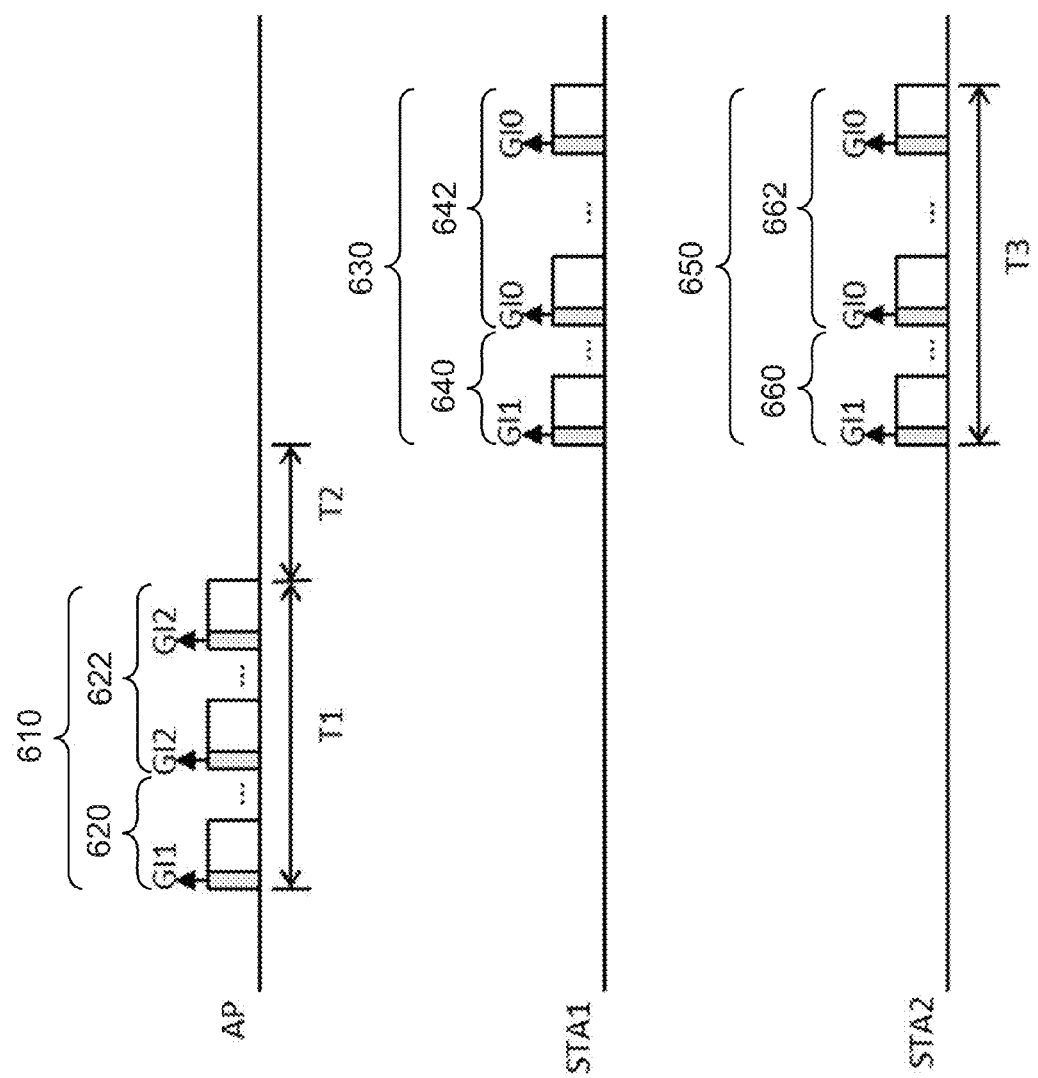
FIG. 6 illustrates a schematic diagram of an example of an exchange of frames among wireless communication devices for OFDMA transmission.

FIG. 6 illustrates a schematic diagram of an example of an exchange of frames among wireless communication devices for OFDMA transmission. The description from FIG. 5 generally applies to FIG. 6, with examples of differences between FIG. 5 and FIG. 6 and other descriptions provided herein for purposes of clarity and simplicity.

In FIG. 6, the AP sends a downlink frame 610 to the participating stations during a time period T1. The downlink frame 610 includes a first part 620 that utilizes a guard interval duration GI1 and a second part 622 that utilizes a guard interval duration GI2. The downlink frame 610 may include an HE-STF field that is in between the first part 620 and the second part 622 of the downlink frame 610. The guard interval duration GI1 may be predetermined whereas the guard interval duration GI2 may be based on a communication environment. Information (e.g., a value) indicative of the guard interval duration GI2 may be stored in the first part 620 of the downlink frame 610, such as in an HE-SIG-A field, and may be utilized by a receiver of the downlink frame 610 to determine that the second part 622 of the downlink frame 610 utilizes guard intervals of the guard interval duration GI2.

When the participating stations receive the downlink frame 610 transmitted by the AP, the participating stations may decode the downlink frame 610 and identify that the participating stations are instructed to transmit their respective frames to the AP after a T2 time period after receiving the downlink frame 610. The participating stations use the predetermined guard interval duration GI1 for the first parts 640 and 660 of their respective uplink frames 630 and 650. The participating stations use another predetermined guard interval duration GI0 for the rest of their respective uplink frames (e.g., the second parts 642 and 662) when the participating stations transmit the respective uplink frames (e.g., 630 and 650) as part of OFDMA communication. The guard interval duration GI0 may be predetermined for UL OFDMA transmission throughout a network (e.g., an IEEE 802.1 lax-compliant network). As the guard interval duration GI0 is predetermined for UL OFDMA transmission throughout the network, the guard interval duration GI0 need not be explicitly indicated (e.g., signaled) to the participating stations. Utilization of the predetermined guard interval duration GI0 may reduce overhead for the OFDMA transmission, such as overhead of the downlink frame 610. The uplink frames 630 and 650 may include a respective HE-STF field that is in between the first parts 640 and 660 and the second parts 642 and 662 of the respective uplink frames frame 630 and 650.

In some aspects, to better accommodate the different propagation delays that may possibly be associated with the different stations, the guard interval duration GI0 may be set to a longer guard interval duration. For example, the guard interval duration GI0 may be predetermined to be set to the longest guard interval defined by the IEEE 802.11 protocol. The use of a longer guard interval may allow the participating stations to synchronize the symbol duration, and the frames sent from the participating stations can avoid inter-symbol interferences caused, for example, by the propagation delay differences among participating stations.

Utilizing of predetermined guard interval durations in the first part and second part of the uplink frames (e.g., 630 and 650) of the participating stations facilitate synchronization of OFDM symbol boundaries of the uplink frames, since the respective OFDM symbol durations contained in the uplink frames are the same for the participating stations. Although the number of symbols contained in the uplink frames may be different, the respective OFDM symbol durations remain the same and aligned for the uplink frames.

Figure 7:
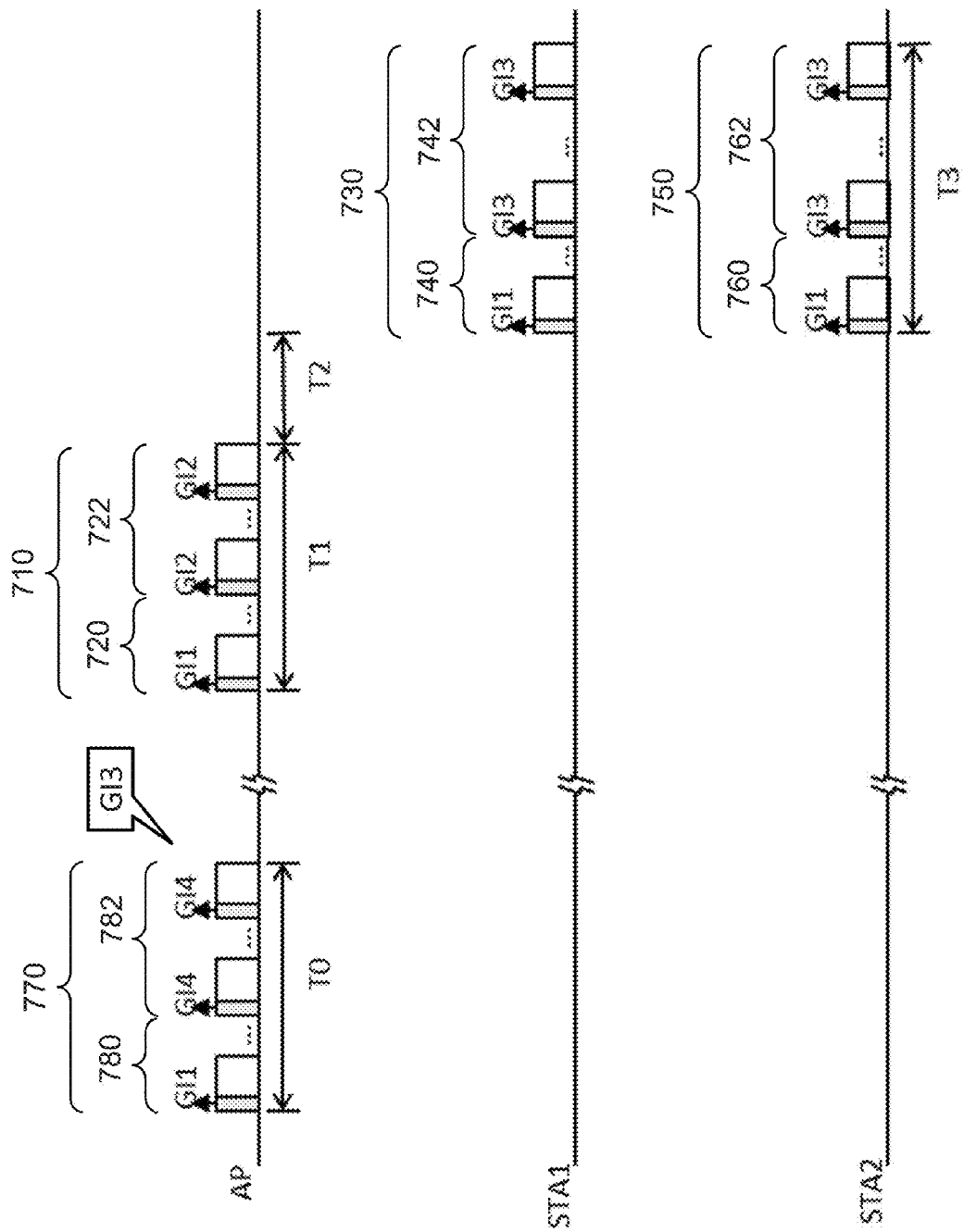
FIG. 7 illustrates a schematic diagram of an example of an exchange of frames among wireless communication devices for OFDMA transmission.

FIG. 7 illustrates a schematic diagram of an example of an exchange of frames among wireless communication devices for OFDMA transmission. The description from FIG. 5 generally applies to FIG. 7, with examples of differences between FIG. 5 and FIG. 7 and other descriptions provided herein for purposes of clarity and simplicity.

In FIG. 7, during a time period T0 that occurs before the AP initiates OFDMA transmission from multiple participating stations, the AP sends a downlink frame 770 that includes information associated with OFDMA transmission, such as a guard interval duration GI3, to be used for UL OFDMA transmission. In one aspect, a payload of the downlink frame 770 includes information regarding GI3 (e.g., information or a value that can be used to identify GI3). In one aspect, the downlink frame 770 may be referred to as a management frame. The downlink frame 770 may be, may include, or may be a part of, a beacon frame that periodically broadcasts the guard interval duration GI3, among other information associated with the OFDMA transmission. The downlink frame 770 may be, may include, or may be a part of, a response frame sent to a station when the station requests to associate with a network associated with the AP and/or requests for capabilities/services of the network. The network may utilize different types of management frames (e.g., beacon frame, probe response frame, association response frame, etc.). For example, a beacon frame may be transmitted by the AP to participating stations on a periodic basis whereas a probe or association response frame may be sent in response to inquiries and/or requests from stations.

The downlink frame 770 includes a first part 780 and a second part 782. The downlink frame 770 may include an HE-STF field that is in between the first part 780 and the second part 782 of the downlink frame 770. A guard interval duration GI1 of the first part 780 of the downlink frame 770 is set at a predetermined duration, and a guard interval duration GI4 of the second part 782 of the downlink frame 770 can be set at another value (e.g., based on communication environment). In some cases, the guard interval duration GI4 is the same as the guard interval duration GI1. In other cases, the guard interval duration GI4 is different from the guard interval duration GI1. In one or more implementations, the downlink frame 770 is, includes, or is a part of, a probe response frame, an association response frame, or a beacon frame of the IEEE 802.11 protocol.

To initiate the OFDMA transmission, the AP sends a downlink frame 710 to the participating stations. The downlink frame 710 may be a trigger frame. The downlink frame 710 includes a first part 720 that utilizes a guard interval duration GI1 and a second part 722 that utilizes a guard interval duration GI2. The downlink frame 710 may include an HE-STF field that is in between the first part 720 and the second part 722 of the downlink frame 710. The guard interval duration GI1 may be predetermined whereas the guard interval duration GI2 may be based on a communication environment. Information regarding the guard interval duration GI2 (e.g., a value indicative of GI2) may be stored in the first part 720 of the downlink frame 710, such as in an HE-SIG-A field, and may be utilized by a receiver of the downlink frame 710 to determine, e.g., for decoding purposes, that the second part 722 of the downlink frame 710 utilizes guard intervals of the guard interval duration GI2.

When the participating stations receive the downlink frame 710 from the AP, the participating stations may decode the downlink frame 710 and identify that the participating stations are supposed to transmit their uplink frames 730 and 750 after a T2 time period after receiving the downlink frame 710. The participating stations use the predetermined guard interval duration GI1 for the first parts 740 and 760 of their respective uplink frames 730 and 750. The participating stations use the guard interval duration GI3 indicated by the downlink frame 770 for UL OFDMA transmission for the second part of their respective uplink frames 730 and 750 (e.g., the remaining parts 742 and 762) when the participating stations transmit the uplink frames as part of OFDMA transmission. The uplink frames 730 and 750 may include a respective HE-STF field that is in between the first parts 740 and 760 and the second parts 742 and 762 of the respective uplink frames frame 730 and 750.

The IEEE 802.11 protocol guard interval durations include, for example, 0.4 µs, 0.8 µs, 1.6 µs, and 3.2 µs. In some aspects, the AP sets the guard interval duration GI3 to better accommodate the different propagation delays associated with the different stations. In one example, GI3 is different from GI1 or GI4. In one example, GI3 is different from GI2. In another example, GI3 is the same as GI2. In another example, GI3 is the same as GI4. In one or more implementations, the guard interval duration GI3 is set to a duration that is longer than any of the guard interval duration GI1, GI2, or GI4. For example, since GI3 is utilized by different STAs simultaneously, GI3 may be set to the longest guard interval defined by the IEEE 802.11 protocol (e.g., 3.2 µs) to better accommodate the different propagation delays associated with the different STAs.

Utilization of predetermined GI1 in the first parts (e.g., 740 and 760) of the uplink frames (e.g., 730 and 750) of the participating stations and utilization of GI3 in the second parts (e.g., 742 and 762) facilitate synchronization of OFDM symbol boundaries of the uplink frames, since the respective OFDM symbol durations contained in the uplink frames are the same for the participating stations. Although the number of symbols contained in the uplink frames may be different, the respective OFDM symbol durations remain the same and aligned for the uplink frames.

Figure 8:
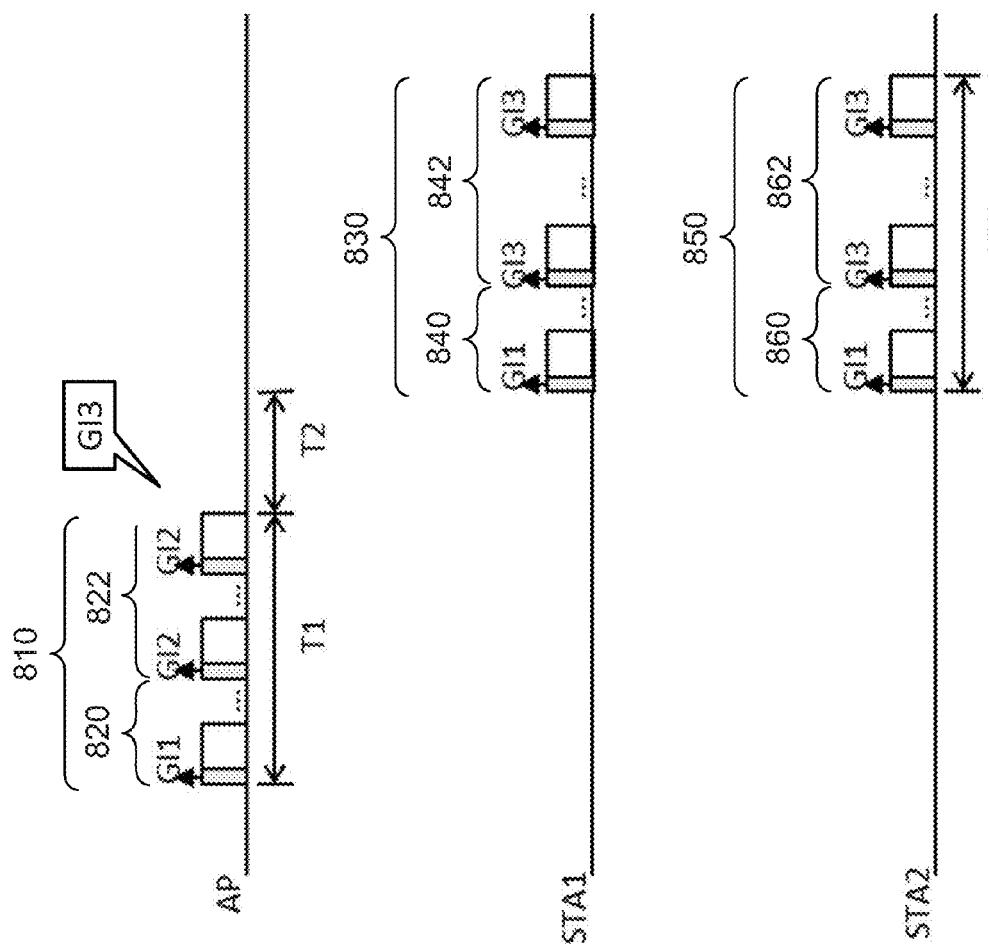
FIG. 8 illustrates a schematic diagram of an example of an exchange of frames among wireless communication devices for OFDMA transmission.

FIG. 8 illustrates a schematic diagram of an example of an exchange of frames among wireless communication devices for OFDMA transmission. The description from FIG. 5 generally applies to FIG. 8, with examples of differences between FIG. 5 and FIG. 8 and other descriptions provided herein for purposes of clarity and simplicity.

In FIG. 8, the AP sends a downlink frame 810 to the participating stations of the OFDMA transmission (e.g., STA1 and STA2) during a time period T1. The downlink frame 810 is utilized to initiate OFDMA transmission. The downlink frame 810 may be a trigger frame. The downlink frame 810 includes a first part 820 that utilizes a guard interval duration GI1 and a second part 822 that utilizes a guard interval duration GI2. The downlink frame 810 may include an HE-STF field that is in between the first part 820 and the second part 822 of the downlink frame 810. The guard interval duration GI1 may be predetermined whereas the guard interval duration GI2 may be based on a communication environment. Information regarding the guard interval duration GI2 (e.g., a value representing GI2) may be stored in the first part 820 of the downlink frame 810, such as in an HE-SIG-A field, and may be utilized by a receiver of the downlink frame 810 to determine, e.g., for decoding purposes, that the second part 822 of the downlink frame 810 utilizes guard intervals of the guard interval duration GI2. The downlink frame 810 may also include information on a guard interval duration GI3 (e.g., information or a value that can identify GI3) to be utilized by the participating stations. In one aspect, the information on the guard interval duration GI3 may be provided in a payload in the second part 822 of the downlink frame 810.

When the participating stations receive the downlink frame 810 transmitted by the AP, the participating stations may decode the downlink frame 810 and identify that the participating stations are supposed to transmit their own respective uplink frame 830 and 850 after a T2 time period after receiving the downlink frame 810. The participating stations may also identify the guard interval duration GI3 to be utilized in the second parts 842 and 862 of the respective uplink frames 830 and 850. The participating stations use the predetermined guard interval duration GI1 for the first parts 840 and 860 of their respective uplink frames 830 and 850. The participating stations use the guard interval duration GI3 indicated by the downlink frame 810 for UL OFDMA transmission for the second part of their respective uplink frames 830 and 850 (e.g., the remaining parts 842 and 862) when the participating stations transmit the uplink frame as part of OFDMA transmission. The uplink frames 830 and 850 may include a respective HE-STF field that is in between the first parts 840 and 860 and the second parts 842 and 862 of the respective uplink frames frame 830 and 850.

In some aspects, the AP sets the guard interval duration GI3 to better accommodate the different propagation delays associated with the different stations. In one example, GB is different from GI1 or GI2. In another example, GI3 is the same as GI2. In one or more implementations, the guard interval duration GI3 is set to a duration that is longer than any of the guard interval duration GI1 or GI2. For example, since GI3 is utilized by different STAs simultaneously, GI3 may be set to the longest guard interval defined by the IEEE 802.11 protocol (e.g., 3.2 µs) to better accommodate the different propagation delays associated with the different STAs.

Utilization of predetermined GI1 in the first parts (e.g., 840 and 860) of the uplink frames (e.g., 830 and 850) of the participating stations and utilization of GI3 in the second parts (e.g., 842 and 862) facilitate synchronization of OFDM symbol boundaries of the uplink frames, since the respective OFDM symbol durations contained in the uplink frames are the same for the participating stations. Although the number of symbols contained in the uplink frames may be different, the respective OFDM symbol durations remain the same and aligned for the uplink frames.

In one or more aspects, methods and systems allow aligning of symbol durations of multiple participating stations for UL OFDMA transmission by setting guard interval durations to be utilized by the participating stations. The methods and systems may facilitate maintaining the same respective OFDM symbol durations and symbol synchronization (or alignment) across MU simultaneous transmission by the participating stations. Such aligning and synchronizing may facilitate decrease of receiver complexity and increase of overall network efficiency for simultaneous transmission as part of OFDMA transmission.

Like reference numerals may designate like elements. For example, same reference numerals GI1, GI2, GI3, T1, T2, and T3 are used in various figures for simplicity and convenience. These components with the same reference numerals have certain characteristics that are the same, but as different figures illustrate different examples, the same reference numeral does not indicate that a component with the same reference numeral has the exact same characteristics. While the same reference numerals are used for certain components, examples of differences with respect to a component are described throughout this disclosure.

Figure 9A:
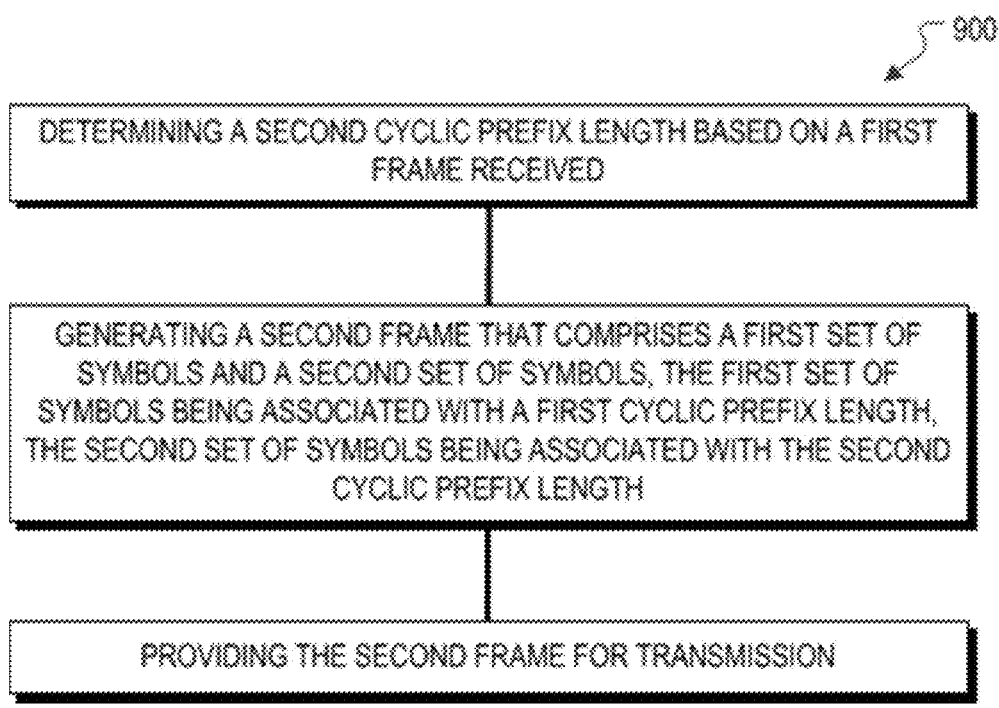
FIGS. 9A through 9C illustrate flow charts of examples of methods for facilitating wireless communication.
Figure 9B:
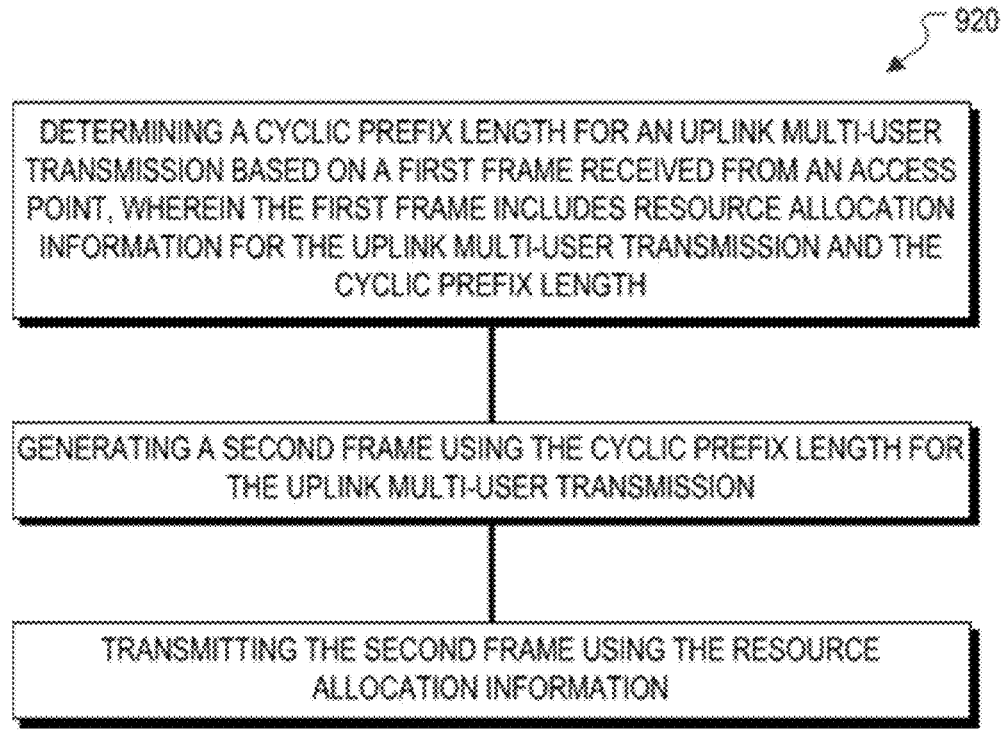
Figure 9C:
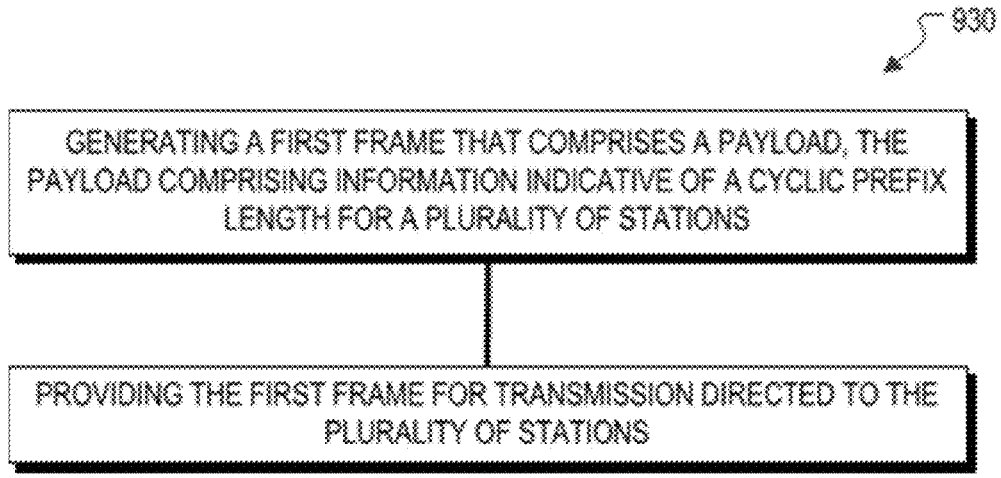

FIGS. 9A through 9C illustrate flow charts of examples of methods for facilitating wireless communication. For explanatory and illustration purposes, the example processes 900, 920 and 930 may be performed by the wireless communication devices 111-115 of FIG. 1 and their components such as a baseband processor 210, a MAC processor 211, a MAC software processing unit 212, a MAC hardware processing unit 213, a PHY processor 215, a transmitting signal processing unit 280 and/or a receiving signal processing unit 290; however, the example processes 900, 920 and 930 are not limited to the wireless communication devices 111-115 of FIG. 1 or their components, and the example processes 900, 920 and 930 may be performed by some of the devices shown in FIG. 1, or other devices or components. Further for explanatory and illustration purposes, the blocks of the example processes 900, 920 and 930 are described herein as occurring in serial or linearly. However, multiple blocks of the example processes 900, 920 and 930 may occur in parallel. In addition, the blocks of the example processes 900, 920 and 930 need not be performed in the order shown and/or one or more of the blocks/actions of the example processes 900, 920 and 930 need not be performed.

Various examples of aspects of the disclosure are described below as clauses for convenience. These are provided as examples, and do not limit the subject technology. As an example, some of the clauses described below are illustrated in FIGS. 9A through 9C.

Clause A. An apparatus for facilitating wireless communication, the apparatus comprising: one or more memories; and one or more processors coupled to the one or more memories, the one or more processors configured to cause: determining a second cyclic prefix length based on a first frame received; generating a second frame that comprises a first set of symbols and a second set of symbols, the first set of symbols being associated with a first cyclic prefix length, the second set of symbols being associated with the cyclic prefix length; and providing the second frame for transmission.

Clause B. An apparatus for facilitating wireless communication, the apparatus comprising: one or more memories; and one or more processors coupled to the one or more memories, the one or more processors configured to cause: determining a cyclic prefix length for an uplink multi-user transmission based on a first frame received from an access point, wherein the first frame includes resource allocation information for the uplink multi-user transmission and the cyclic prefix length; generating a second frame using the cyclic prefix length for the uplink multi-user transmission; and transmitting the second frame using the resource allocation information.

Clause C. A computer-implemented method of facilitating wireless communication, the method comprising: generating a first frame that comprises a payload, the payload comprising information indicative of a cyclic prefix length for a plurality of stations; and providing the first frame for transmission directed to the plurality of stations.

In one or more aspects, additional clauses are described below.

A method comprising one or more methods or operations described herein.

An apparatus comprising one or more memories (e.g., 240, one or more internal, external or remote memories, or one or more registers) and one or more processors (e.g., 210) coupled to the one or more memories, the one or more processors configured to cause the apparatus to perform one or more methods or operations described herein.

An apparatus comprising means (e.g., 210) adapted for performing one or more methods or operations described herein.

A computer-readable storage medium (e.g., 240, one or more internal, external or remote memories, or one or more registers) comprising instructions stored therein, the instructions comprising code for performing one or more methods or operations described herein.

In one aspect, a method may be an operation, an instruction, or a function and vice versa. In one aspect, a clause may be amended to include some or all of the words (e.g., instructions, operations, functions, or components) recited in other one or more clauses, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware or software depends upon the particular application and design constraints imposed on the overall system. Skilled artisans may implement the described functionality in varying ways for each particular application.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using a phrase means for or, in the case of a method claim, the element is recited using the phrase step for.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. An apparatus for facilitating wireless communication, the apparatus comprising:
one or more memories; and
one or more processors coupled to the one or more memories, the one or more processors configured to cause:
receiving, in a trigger frame transmitted by an access point, an indication of a first guard interval length, wherein the trigger frame allocates one or more resources for an uplink (UL) multi-user (MU) transmission and solicits the UL MU transmission, wherein a value of the first guard interval length is to be used by each of a plurality of stations, including the apparatus, associated with the UL MU transmission,
generating an uplink frame for the UL MU transmission solicited by the trigger frame, wherein the uplink frame comprises a payload and a physical layer (PHY) header, and
transmitting the uplink frame using a resource allocated by the trigger frame to the apparatus,
wherein at least a portion of the payload of the uplink frame is associated with the first guard interval length.

2. The apparatus of claim 1, wherein the trigger frame comprises an implicit indication of when the uplink frame is to be transmitted as part of the UL MU transmission.

3. The apparatus of claim 1, wherein the one or more processors are further configured to cause transmitting the uplink frame at a predetermined time after receipt of a PHY protocol data unit (PPDU) that carries the trigger frame.

4. The apparatus of claim 1, wherein the UL MU transmission comprises an uplink Orthogonal-Frequency Division Multiple Access (OFDMA) transmission, and wherein the first guard interval length is for the uplink OFDMA transmission.

5. The apparatus of claim 1, wherein the PHY header is associated with a second guard interval length.

6. The apparatus of claim 5, wherein the payload is comprised of a first set of orthogonal frequency-division multiplexing (OFDM) symbols and each OFDM symbol in the first set of OFDM symbols includes a guard interval of the first guard interval length.

7. The apparatus of claim 6, wherein the PHY header is composed of a second set of OFDM symbols and a third set of OFDM symbols and each OFDM symbol in the second set of OFDM symbols includes a guard interval of the second guard interval length and each OFDM symbol in the third set of OFDM symbols includes a guard interval of the first guard interval length.

8. The apparatus of claim 7, wherein the second set of OFDM symbols comprises a legacy short training field, a legacy long training field, a legacy signal field, and a high efficiency signal A field, and wherein the third set of OFDM symbols comprises a high efficiency long training field.

9. A method for facilitating wireless communications between a wireless device and an access point, the method comprising:
receiving, by the wireless device in a downlink frame from the access point, an indication of a first cyclic prefix (CP) length, wherein the downlink frame is for allocating resources for an uplink (UL) multi-user (MU) transmission and for soliciting the UL MU transmission, wherein the first CP length is the same length to be used for all of a plurality of stations addressed by the downlink frame in the UL MU transmission;
generating, by the wireless device, an uplink frame for the UL MU transmission solicited by the downlink frame, wherein the uplink frame comprises a payload; and
transmitting the uplink frame using a resource allocated by the downlink frame,
wherein at least a portion of the payload of the uplink frame is associated with the first CP length.

10. The method of claim 9, wherein the uplink frame further comprises a legacy header, and wherein at least a portion of the legacy header is associated with a second CP length.

11. The method of claim 10, wherein the payload is comprised of a first set of orthogonal frequency-division multiplexing (OFDM) symbols and each OFDM symbol in the first set of OFDM symbols includes a CP of the first CP length, and
wherein the legacy header is composed of a second set of OFDM symbols and each OFDM symbol in the second set of OFDM symbols includes a CP of the second CP length.

12. The method of claim 9, wherein the UL MU transmission is an Orthogonal Frequency-Division Multiple Access (OFDMA) transmission.

13. The method of claim 9, wherein the uplink frame is transmitted at a predetermined time after a physical layer protocol data unit (PPDU) that carries the downlink frame.

14. The method of claim 9, wherein a payload of the downlink frame comprises the indication of the first CP length.

15. A computer-implemented method of facilitating wireless communication, the method comprising:
determining, by an access point, a first guard interval to be used by a set of stations participating in a multi-user (MU) uplink (UL) transmission;
creating, by the access point, a trigger frame, wherein the trigger frame includes information indicating the first guard interval for the UL MU transmission, wherein the trigger frame allocates resources for the UL MU transmission and solicits the UL MU transmission;
transmitting, by the access point, the trigger frame to the set of stations; and
processing an uplink frame comprising a plurality of frames from the set of stations based on the resources for the UL MU transmission, wherein each of the plurality of frames comprises a respective payload, and wherein at least a portion of the respective payload is associated with the first guard interval.

16. The computer-implemented method of claim 15, wherein each of the plurality of frames comprises a respective non-legacy header, and wherein at least a portion of the respective non-legacy header is associated with the first guard interval.

17. The computer-implemented method of claim 16, wherein for each of the plurality of frames, a second portion of the respective non-legacy header is associated with a second guard interval.

18. The computer-implemented method of claim 15, wherein the trigger frame comprises an indication of when each of the plurality of frames is to be transmitted as part of the UL MU transmission.

19. The computer-implemented method of claim 15, wherein the UL MU transmission is an Orthogonal Frequency-Division Multiple Access (OFDMA) transmission.

\* \* \* \* \*